United States Patent Office 2,946,703
Patented July 26, 1960

2,946,703

METHOD AND COMPOSITION FOR COMBATING SLAG FORMATION ON REFRACTORY SURFACES

Harris Thompson, Downers Grove, Ill., assignor to Nalco Chemical Company, a corporation of Delaware No Drawing. Filed Apr. 16, 1956, Ser. No. 578,194

15 Claims. (Cl. 117—123)

This invention relates to the inhibition or prevention of slag formation on refractory surfaces, more particularly, to a method for combating slag formation and a composition especially adapted therefor.

Slag formation on refractory surfaces is a troublesome and expensive problem in a number of processes where high temperature gases are conducted over the refractories. The problem is especially pronounced in the steel industry, where high temperature furnace effluent gases are conducted over refractory surfaces in the regenerative method of preheating air and possibly the fuel. Like problems arise in similar operations, such as in glass making.

In the steel industry, especially in the open-hearth process, high temperature effluent gases are conducted from the furnace over refractory surfaces, to transfer their heat content to the refractories. The refractories in the succeeding cycle transfer the heat to the air supplied to the furnace for combustion and, at times, to the fuel. The effluent or combustion gases are at a very high temperature corresponding to the steel making operation and reach the refractories at a temperature on the order of two to three thousand degrees Fahrenheit, commonly at about 2200–2500° F.

In the open hearth process, for example, the effluent gases are the result of supplying air and fuel through ports in the furnace and over the hearth, for combustion to provide heat and for reaction of the bath and is components. Materials volatilize into or are entrained as fine particles by the effluent or combustion gases, and much of these materials eventually reaches the regenerative zones, which are commonly filled with open refractory brickwork termed checkers or checker brick. The checkers may be constructed of several kinds of refractory brick, such as fire clay, high alumina, silica, silica-alumina, magnesite and chrome brick. Volatilized and entrained substances deposit from the gases on the surfaces of the checkers and form a tenacious slag which plugs and insulates the checkers. From time to time during the succession of heats in the furnace, checker cleaning methods are employed, such as air lancing, to remove as much as possible of the deposits. Nevertheless, the slag continually builds up until the furnace must be shut down and the checkers dismantled and rebuilt.

The open hearth is commonly constructed with two pairs of regenerators, each of which includes two checker chambers. The air, and at times the fuel, is first supplied to the furnace through one regenerator or pair of checkers, is consumed in the combustion process and the combustion gases exit through the other, heating the latter. The flow of air and combustion gases is then reversed, and the air flow is through the heated checkers and to the furnace, and out through the other pair of checkers as combustion gases, to reheat it. As the slag deposits build up in the checkers, gas flow becomes restricted and heat transfer is reduced to a point where the checkers can no longer be used efficiently. At that time, the checkers are dismantled, and they are rebuilt with new bricks and whatever used bricks can be salvaged. For example, as many as 30,000 or even 40,000 bricks may have to be replaced. This is because the slag fuses to the bricks and also fuses the bricks together. The hard fused slag from an open hearth furnace is characterized by having an iron oxide content, calculated as $Fe_2O_3$, of 80% or greater. The following is an analysis of a slag which is typical of the better conditions encountered:

|  | Percent |
|---|---|
| Silica ($SiO_2$) | 1.8 |
| Ferric oxide ($Fe_2O_3$) | 90.0 |
| Calcium oxide (CaO) | 3.4 |
| Magnesium oxide (MgO) | Trace |
| Sodium oxide ($Na_2O$) | 0.3 |
| Zinc oxide (ZnO) | 3.8 |

Thus, the checker slag deposits include metallic oxides and silicates and are usually predominantly various oxides of iron with minor amounts of silica, calcium oxide and zinc oxide. Other materials may also be present.

In its broader aspects, this invention has for its object the reduction of the slag problems associated with the exposure of refractory surfaces to hot gases from which slag-forming materials deposit.

A particular object of the invention is to provide a method for treating the refractories so as to inhibit or minimize the formation of deleterious slag deposits, reducing or preventing the formation of the hard bonded coatings otherwise encountered.

More particularly, it is an object to provide a method of chemically treating the refractories and a composition therefor which favorably influences slag formation, so that the character of the deposits is altered and they are much more readily removed, resulting in remarkable savings in the refractory materials.

A further object is to provide the refractories with a coating of materials which prevent or minimize slag formation, and cause the slag deposits to be readily removable, such as by air or steam lancing and/or by a simple physical treatment upon dismantling, which recovers or salvages the refractory articles.

An impotant object of the invention is to provide a method and composition which inhibits the formation of high temperature metallic oxide deposits, especially those composed of a major proportion of iron oxides.

An additional object is to provide a method which is simply carried out before, and if desired, during operation of the furnace, and which is relatively low in cost.

An important specific object is to provide a method and composition for combating slag formation in the checkers employed in regenerative methods in the steel industry, such as in open-hearth furnaces. These and other objects and advantages of the invention will be apparent on reference to the specification.

In accordance with the invention, a method is provided for combating slag formation on refractory surfaces exposed to hot gases from which slag-forming materials deposit on the surfaces, which involves providing a coat of magnesium oxide on the refractory surfaces. Preferably also, the coat includes a non-slagging metallic halide, that is, a metallic halide which is non-slag forming or does not produce a harmful slag under the conditions of operation. The coat is provided on the refractory surfaces during exposure to the hot gases, i.e., is present thereon during exposure, thus combating slag formation. Outstanding results have been obtained by applying an initial coat or precoat on the surfaces, after which they are exposed to the hot gases for heat transfer. Preferably also, a coat of the materials is subsequently applied on the surfaces in the course of the exposure to hot gases, i.e., from time to time during operation.

The coat of magnesium oxide and, preferably, metallic halide intimately mixed therewith, is preferably provided on the refractory surfaces by direct application of a corresponding coating composition to the surfaces, that is, the coating composition is sprayed or swabbed, for example, immediately on the surfaces to furnish an effective coat. A corresponding coating composition is one which will yield magnesium oxide and metallic halide present as such on the surfaces. It is also preferred to apply the composition in the form of a concentrate of the materials, which is preferably a concentrated slurry. Highly advantageous resutls are obtained by employing an aqueous slurry of the materials.

Refractory brick surfaces may be sprayed or otherwise coated with the slurry during or just following the assembly of the bricks into the checker chambers. Periodically thereafter, the slurry is sprayed into the brickwork lattice through ports, the active ingredients depositing on the surfaces of the brickwork and forming a thin loose or lightly bonded layer or stratum thereon. Owing to the nature of the active ingredients, it is preferable to include a wetting agent and a dispersing agent in the composition, to furnish a slurry which can be sprayed uniformly throughout the checker chambers and deposit a dispersed, finely particled or granular solid coat.

A slag inhibiting composition is provided in the invention which is adapted for slurrying in water and for uniform application of the slurry to the refractory surfaces, which constitutes an intimate mixture of the several components named above. This composition is readily dispersed in water and maintained in uniform dispersion for application to the refractories.

In the provision of a coat of magnesium oxide on the refractory surfaces, any corresponding material which will provide magesium oxide on the surface of the refractory during the operation may be used, such as other magnesium compounds which decompose under the conditions to form magnesium oxide, for example, magesium hydroxide, magnesium carbonate and other magesium compounds. Most advantageously, magesium oxide itself is used for coating the refractories, and a commercial grade thereof may be satisfactory. Magnesium oxide is the chief ingredient of the active composition, a major proportion being employed, preferably 90% by weight or more.

Various metallic halides or corresponding materials providing the same, which are non-slagging under the conditions may be used, preferably a copper halide. The halides referred to include both the simple halides and other forms, such as mixed salts or compounds, for example, the oxychlorides. Outstanding results are obtained by using commercial copper oxychloride (having a formula such as $CuCl_2.3Cu(OH)_2$ or $3CuO.CuCl_2.3H_2O$). A relatively small minor proportion of the halide is admixed with the magnesium compound, preferably about 2–10% by weight.

A copper halide is apparently the most advantageous halide. However, other halides such as those of cobalt and manganese may be substituted in whole or in part. On the other hand, compounds which may contribute to or accelerate harmful fusion and slag formation are not recommended, and thus, iron, calcium, alakali metal and other such halides are not used.

As noted above, a very effective and practical method of application, especially in checker chambers, is to deposit the active materials from an aqueous slurry thereof. These materials slurry very poorly alone, and it has been found that the operation is greatly improved by including a minor effective proportion of a water wetting agent and of a water dispersing agent in the composition. An alkylnaphthalene alkali metal sulfonate is a preferred wetting agent, but a variety of the many well known wetting agents can be used instead, for example, alkyl polyether phenols, polyethyleneglycol esters of fatty acids having 12 carbon atoms or more in the fatty acid radicals, dialkyl sodium sulfosuccinates and alkyl benzene sodium sulfonates. Likewise, an alkali metal salt of carboxymethyl cellulose is the preferred dispersing agent, but one of any other known dispersing agents can be used, such as metal lignosulfonates, and water soluble gums. The carboxymethyl cellulose salt apparently functions in the manner of a protective colloid, acting with the wetting agent to keep the active ingredients finely dispersed throughout the slurry. From a fraction of a percent to several percent by weight of each of these agents is ordinarily satisfactory. The proportion is based on the weight of the active materials, those providing magnesium oxide and the metallic halide. In this manner, complete uniform coverage of the refractory surfaces is obtained.

It has been found in the checker treatment of open-hearth furnaces, for example, that the solid composition of active ingredients, wetting agent and dispersing agent is most desirably incorporated in water in a weight ratio of about 1 to 5 parts of the composition to 10 parts of water. The refractory checker surfaces are then covered insofar as possible with the slurry, preceding furnace operation and during the course of the operation.

The slag formation described above is complex and apparently involves eutectic melts and possibly condensation and desublimation mechanisms. Despite the difficulty of the problem, it has been found very surprisingly that the slag formation can be combated as described, to prevent the accumulation of hard dense checker brick deposits and limit the deposits to friable material which easily can be blown off the bricks periodically by the normal checker cleaning techniques. Slag build-up is decreased, and that which eventually accumulates can to a large extent be removed without difficulty, to return the bricks to service. Consequently, the restriction of gas flow and reduced heat transfer which accompany slag formation and both of which reduce the overall thermal efficiency, are minimized to a considerable extent. Maintenance and replacement costs are greatly reduced. In particular, the period for which the furnace can be operated before shutdowns to dismantle the checkers is substantially extended, and the destruction and waste of refractory material is greatly lowered.

The following is an example of open-hearth furnace operation wherein the checkers were treated and slag formation was inhibited according to the invention. It will be understood that the example is not limited to the operation, materials, proportions and procedures which are set forth therein for illustrative purposes only, but various conditions may differ while falling within the scope of the invention and accomplishing its objects.

EXAMPLE

A campaign which extended for about three months was conducted in a basic open-hearth furnace of a steel mill. The furnace had two pairs of regenerators, each pair including two checker chambers, for a total of four checker chambers. The checker bricks were constructed of fire clay. There were 10,000 checker bricks in each chamber, or a total of 40,000 bricks, having a size of 3″ x 4½″ x 9″. The furnace was fired with natural gas.

During the rebuilding of the checkers following a prior campaign, the checker surfaces were sprayed as each course of brickwork was laid, with a slurry of an intimate mixture having the following composition, mixed at the rate of 5 pounds of the mixture per 20 pounds of water:

| Ingredients: | Percent by weight |
| --- | --- |
| Magnesium oxide | 92.5 |
| Copper oxychloride | 4.0 |
| Alkylnaphthalene-sodium sulfonate (Du Pont Alkanol B) | 0.5 |
| Sodium carboxymethyl cellulose | 3.0 |

The following are the composition and physical characteristics of the commercial magnesium oxide and copper oxychloride used in the above composition:

Magnesium oxide

| | Percent |
|---|---|
| $SiO_2$ | 0.9 |
| $Fe_2O_3$ | 0.3 |
| $Al_2O_3$ | 0.2 |
| CaO | 1.5 |
| MgO | 93.9 |
| Ignition loss | 3.0 |
| Through 325 mesh screen | 98.0 |

Copper oxychloride

| | |
|---|---|
| Copper | 58.0–59.0 |
| Chlorine | 16.0–17.5 |
| Zinc | under 0.05 |
| Arsenic | under 0.000015 |
| Lead | under 0.003 |
| Iron | under 0.03 |
| $SO_3$ | under 0.3 |
| $SiO_2$ | under 0.01 |
| Caught on a 325 mesh screen | under 0.5 |

75 pounds of the slurry was used to precoat each checker chamber, or a total of 300 pounds for the four checker chambers of the furnace. The slurry was easily made by mixing with a paddle, excellent wetting and dispersion being obtained. The slurry was poured through a screened funnel into a pressure gun apparatus operating with compressed air at 90 p.s.i.g. A good film coating was established on all brickwork, walls and ceilings of the checker chambers.

Each checker chamber was then sprayed twice per week, on Monday and Thursday, using a slurry composition of 10 pounds of the above composition in 20 pounds of water. The slurry was sprayed into the chambers with the air gun, spraying through ports in the bulkhead of each chamber. The slurry was sprayed into the chamber when the furnace was down-drafting through that end. There was no trouble extending the spray stream throughout the checker chamber, and less than an hour was required to spray all four chambers.

The chambers were air lanced once a week in the usual manner, every Wednesday. The operators found that the checkers blew easily during air lancing, removing the visible deposit.

The furnace operated for a total of 200 heats during the campaign before it became necessary to tear down and rebuild the checker chambers, which was 20 heats longer than the shop average per furnace. The heat rate, or amount of fuel consumed per ton of steel produced, was good throughout the campaign.

The checker chambers showed excellent results of the treatment in preventing the hard, glassy, molten slag normally experienced without treatment. The plant had previously found that the usual experience was to find all of the brickwork fused together, requiring the use of bars to break the bricks apart. This resulted in a considerable loss of damaged brickwork, the average being a loss of 15,000 bricks per furnace per campaign and reaching as high as 40,000 bricks.

In contrast to the prior experience, the slag was very friable throughout the entire checker chamber, even on the top course, clear back to the breastwork coming from the slag pocket, where the greatest heat input occurs.

The slag was easily removed by hand with only a slight amount of pressure and came free from the brick surfaces in a smooth plane. The precoat was visible, either on the brick from which the slag was removed, or on the smooth slag surface plane which had been lightly bonded to the brick facing.

For this campaign, only 4,000 bricks had to be replaced for the entire brickwork, and it was noted that this figure could be considerably lessened with closer supervision, to avoid discarding good, salvageable brickwork. The saving was thus 11,000 bricks based on the previous average.

It will be seen that the invention provides a marked improvement in furnace operation and in the protection of refractory materials, greatly reducing the waste of material and cost of replacement. It is of course most advantageous to coat or cover the refractory surfaces as completely as possible, but even where complete coverage cannot be secured for some reason, partial coating of the surfaces is advantageous. The best results are apparently obtained when the refractory surfaces are initially coated or precoated, and the subsequent periodic application of the composition or renewal of the coat contributes to the most effective inhibition of slag formation.

The invention thus provides a greatly improved method of treating refractory surfaces and combating slag formation and a new and remarkably effective composition. The invention is especially important in its application to regenerative gas preheating in pyrochemical processes such as open-hearth and smelting operations in the steel industry, and it finds other applications as well. Operations are extended and improved, costs are reduced and waste of materials is greatly decreased.

The invention is hereby claimed as follows:

1. In a regenerative gas preheating method wherein hot effluent gases containing slag-forming materials are conducted over regenerative refractory surfaces to transfer heat thereto, and fresh gases are conducted over the thus heated refractories to transfer heat from the refractories to the fresh gases, the improvement for combating slag formation on said refractory surfaces which comprises providing a coat of magnesium oxide on said surfaces.

2. The method for combating slag formation on refractory surfaces exposed to hot gases from which slag-forming materials deposit thereon, which comprises providing a non-slagging coat of magnesium oxide and a non-slagging metallic halide on said refractory surfaces by direct application to said surfaces of a coating composition which will yield magnesium oxide and said metallic halide on the surfaces, and contacting the coated refractory surfaces with said hot gases from which slag-forming materials deposit.

3. The method for combating slag formation on refractory surfaces exposed to hot gases from which slag-forming materials deposit thereon, which comprises providing a non-slagging coat of magnesium oxide and a non-slagging metallic halide on said refractory surfaces by deposition of said surfaces from an aqueous slurry of a coating composition which will yield magnesium oxide and said metallic halide on the surfaces, and contacting the coated refractory surfaces with said hot gases from which slag-forming materials deposit.

4. The method for combating slag formation on refractory surfaces exposed to hot gases from which slag-forming materials deposit thereon, which comprises providing a non-slagging coat of magnesium oxide and a copper halide on said refractory surfaces by deposition on said surfaces from a concentrate of a coating composition which will yield magnesium oxide and copper halide on the surfaces, and contacting the coated refractory surfaces with said hot gases from which slag-forming materials deposit.

5. The method for combating slag formation on refractory surfaces exposed to hot gases from which slag-forming materials deposit thereon, which comprises providing a non-slagging coat of a major proportion of magnesium oxide and a minor proportion of copper oxychloride on said refractory surfaces by deposition on said surfaces from an aqueous slurry of a coating composition which will yield magnesium oxide and copper oxychloride on the surfaces and also containing a wetting agent and a dispersing agent, and contacting the coated refractory surfaces with said hot gases from which slag-forming materials deposit.

6. The method for combating slag formation on refractory surfaces exposed to hot gases from which slag-forming materials deposit thereon, which comprises initially providing a non-slagging coat of magnesium oxide and a non-slagging metallic halide on said refractory surfaces, and contacting the coated refractory surfaces with said hot gases from which slag-forming materials deposit.

7. The method for combating slag formation on refractory surfaces exposed to hot gases from which slag-forming materials deposit thereon, which comprises initially providing a non-slagging coat of magnesium oxide and a non-slagging metallic halide on said refractory surfaces, contacting the coated refractory surfaces with said hot gases from which slag-forming materials deposit, and subsequently providing a coat of said oxide and halide on said surfaces in the course of said contacting.

8. In the manufacture of steel, the method for combating slag formation on regenerative refractory surfaces, which comprises providing a coat of magnesium oxide on said surfaces.

9. In the manufacture of steel, the method for combating slag formation on regenerative refractory surfaces, which comprises initially providing a coat of magnesium oxide and a non-slagging metallic halide on said surfaces, and subsequently providing a coat of said oxide and halide on said surfaces in the course of exposure to hot effluent gases.

10. The method for combating slag formation on the regenerative checker brickwork of an open-hearth furnace, which comprises initially coating the surfaces of said brickwork with a mixture of magnesium oxide and a copper halide.

11. The method for combating slag formation on the regenerative checker brickwork of an open-hearth furnace, which comprises initially coating the surfaces of said brickwork with a mixture of magnesium oxide and copper oxychloride, and subsequently coating said surfaces with said mixture in the course of exposure to hot effluent gases.

12. The method for combating slag formation on the regenerative checker brickwork of an open-hearth furnace, which comprises initially coating the surfaces of said brickwork with an aqueous slurry of a major proportion of magnesium oxide and a minor proportion of copper oxychloride also containing an alkylnaphthalene alkali metal sulfonate wetting agent and an alkali metal carboxymethyl cellulose dispersing agent, and subsequently spraying said surfaces with said slurry in the course of exposure to hot effluent gases.

13. A slag inhibiting composition adapted for slurrying in water and uniform application of the slurry to refractory surfaces which comprises a major proportion of magnesium oxide, a minor proportion of a copper halide, a wetting agent selected from the group consisting of alkylnaphthalene alkali metal sulfonates, alkyl polyether phenols, polyethyleneglycol esters of fatty acids having at least 12 carbon atoms in the fatty acid radical, dialkyl sodium sulfosuccinates, and alkyl benzene sodium sulfonates, and a dispersing agent selected from the group consisting of alkali metal salts of carboxymethyl cellulose, metal lignosulfonates, and water-soluble gums.

14. A slag inhibiting composition adapted for slurrying in water and uniform application of the slurry to refractory surfaces, which comprises a major proportion of magnesium oxide, a minor proportion of a copper halide, an alkylnaphthalene alkali metal sulfonate wetting agent, and an alkali metal carboxymethyl celluose dispersing agent.

15. A slag inhibiting composition adapted for uniform application to refractory surfaces, which consists essentially of in parts by weight, 1 to 5 total parts of magnesium oxide, copper oxychloride in a minor proportion relative thereto, an alkylnaphthalene sodium sulfonate wetting agent, and sodium carboxymethyl cellulose as a dispersing agent, and 10 parts of water.

References Cited in the file of this patent

UNITED STATES PATENTS

| | | |
|---|---|---|
| 1,653,918 | Martin | Dec. 27, 1927 |
| 2,234,080 | Mitchell et al. | Mar. 4, 1941 |
| 2,347,968 | Ross | May 2, 1944 |
| 2,614,050 | Rusoff | Oct. 14, 1952 |

OTHER REFERENCES

Ser. No. 382,101, Passelecq et al. (A.P.C), published May 11, 1943.

UNITED STATES PATENT OFFICE

CERTIFICATE OF CORRECTION

Patent No. 2,946,703                               July 26, 1960

Harris Thompson

It is hereby certified that error appears in the printed specification of the above numbered patent requiring correction and that the said Letters Patent should read as corrected below.

Column 1, line 42, for "is" read -- its --; line 59, after "hearth" insert -- furnace --; column 3, line 12, for "resutls" read -- results --; same column 3, lines 35, 38, 39, and 40, for "magesium", each occurrence, read -- magnesium --.

Signed and sealed this 11th day of April 1961.

(SEAL)

Attest:
ERNEST W. SWIDER

Attesting Officer

ARTHUR W. CROCKER
Acting Commissioner of Patents